US006657837B1

(12) United States Patent
Morris et al.

(10) Patent No.: US 6,657,837 B1
(45) Date of Patent: Dec. 2, 2003

(54) CIRCUIT BREAKER INCORPORATING FAULT LOCKOUT PROTECTION

(75) Inventors: Robert A. Morris, Burlington, CT (US); Hemant K. Mody, Avon, CT (US); Thomas F. Papallo, Farmington, CT (US); James I. Smith, Avon, CT (US); Nataniel de Jesus Barbosa Vicente, Bristol, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/473,420

(22) Filed: Dec. 29, 1999

(51) Int. Cl.$^7$ .................................................. H02H 3/00
(52) U.S. Cl. ............................................. 361/72; 361/73
(58) Field of Search ............................. 361/93, 94, 95, 361/96, 72, 73, 74, 75; 324/509

(56) References Cited

U.S. PATENT DOCUMENTS

| | | | |
|---|---|---|---|
| 4,331,915 A | 5/1982 | Fielden ........................ 324/110 |
| 4,420,721 A | 12/1983 | Dorey et al. ................. 324/110 |
| 4,497,010 A | * 1/1985 | Funahashi .................... 327/91 |
| 4,589,052 A | 5/1986 | Dougherty ................... 361/94 |
| 4,672,501 A | 6/1987 | Bilac et al. .................... 361/96 |
| 4,689,570 A | 8/1987 | Ohgaki et al. .............. 324/418 |
| 4,754,247 A | 6/1988 | Raymont et al. ........... 335/202 |
| 4,810,950 A | 3/1989 | Young ........................... 324/57 |
| 4,945,443 A | 7/1990 | DeBiasi et al. .............. 361/93 |
| 5,091,690 A | 2/1992 | D'Antonio et al. ......... 324/107 |
| 5,399,955 A | 3/1995 | Glaser et al. ............... 323/208 |
| 5,461,300 A | 10/1995 | Kappenman ................ 323/215 |
| 5,514,964 A | * 5/1996 | Benesh et al. .............. 324/509 |
| 5,534,782 A | * 7/1996 | Nourse ........................ 324/500 |
| 5,587,662 A | 12/1996 | Kelley et al. ............... 324/713 |

(List continued on next page.)

OTHER PUBLICATIONS de Oliveira, A. et al., "Practical Approaches for AC System Harmonic Impedance Measurements", IEEE Transactions on Power Delivery, vol. 6, No. 4, Oct. 1991, pp. 1721–1726.

(List continued on next page.)

*Primary Examiner*—Brian Sircus
*Assistant Examiner*—Danny Nguyen
(74) *Attorney, Agent, or Firm*—Cantor Colburn LLP

(57) ABSTRACT

Transformers (14) inject test voltage signals of know frequency to each phase of the load side of an electrical distribution circuit (15). Processor (32) waits for a delay period to allow transient effects of the injected signals to settle, and then accepts the sampled test current signals provided by current transformers (12) through conditioning circuit (16). This process is repeated by injecting test voltages at different frequencies, which are selected by processor (32) based on stored instructions. Processor (32) uses the sampled signals to determine a representative current for the load side of the distribution circuit (15) and then compares the representative current with a predetermined current threshold value stored in non-volatile memory (40). If the current is above this threshold, processor (32) provides a lockout signal to the fault lockout device (48) and fault lockout flag (50). Upon receiving this lockout signal, fault lockout device (48) prevents the closure of the breaker contacts (17), and fault lockout flag (50) provides for remote indication of breaker lockout. If the current is below the threshold value, fault lockout device (48) is not activated, and the circuit breaker contacts (17) are allowed to close.

29 Claims, 4 Drawing Sheets

U.S. PATENT DOCUMENTS

| | | | | |
|---|---|---|---|---|
| 5,594,748 | A | | 1/1997 | Jabr .............................. 372/38 |
| 5,631,569 | A | | 5/1997 | Moore et al. ................ 324/713 |
| 5,650,907 | A | * | 7/1997 | Ishii et al. ................... 324/509 |
| 5,691,871 | A | * | 11/1997 | Innes ......................... 361/93.2 |
| 5,701,080 | A | | 12/1997 | Schumacher et al. ........ 324/539 |
| 5,808,848 | A | * | 9/1998 | Pollman et al. ................ 361/54 |
| 5,818,245 | A | | 10/1998 | Allfather ..................... 324/707 |
| 5,936,817 | A | * | 8/1999 | Matsko et al. ............... 324/500 |
| 6,028,945 | A | | 2/2000 | Gayle ......................... 381/120 |
| 6,208,120 | B1 | * | 3/2001 | Gibbs ......................... 324/509 |
| 6,330,140 | B1 | * | 12/2001 | Wilson-Jones et al. ...... 324/509 |

OTHER PUBLICATIONS

Samesima, M.I. et al., "Frequency Response Analysis and Modeling of Measurement Transformers Under Distorted Current and Voltage Supply", IEEE Transactions on Power Delivery, vol. 6, No. 4 Oct. 1991, pp.1762–1768.

Frankenberg, W. et al., "Assessment of Harmonic Interference From Shipborne Coverter Equipment for Compliance with Mains Quality Requirements", IEEE Transactions on Power Delivery, vol. 6, No. 4, Oct. 1991, pp.1735–1739.

Czarnecki, L.S. et al., "On–Line Measurement of Equivalent Parameters for Harmonic Frequencies of a Power Distribution System and Load", IEEE Transactions on Instrumentation and Measurement, vol. 45, No. 2, Apr. 1996, pp.467–472.

Rhode, J.P. et al., "Complete Characterization of Utilization–Voltage Power System Impedance Using Wideband Measurement", 1996 IEEE Industrial and Commercial Power Systems Technical Conference Record, pp. 123–130.

* cited by examiner

CIRCUIT BREAKER INCORPORATING FAULT LOCKOUT PROTECTION

BACKGROUND OF THE INVENTION

This invention relates to circuit breakers, and, more particularly, to a fault lockout protection incorporated in a circuit breaker.

In accordance with the terms used throughout the circuit protection industry, circuit breaker "making capacity" describes the ability to close a circuit breaker onto a high level short circuit current associated with a low power factor. The so-called "making current" peak value, depending on switching transients and the point on the associated voltage wave closing angle for power factors between 0.15 and 0.20 is in the order of 2.309 to 2.183 times the rms current value. With a low power factor equal to approximately 0.04, the making current peak value can reach 2.663 times the rms current value. An rms fault current level of 100 KA, for example, would result in closing the circuit breaker onto a peak short circuit current of roughly 230 KA for 0.15 power factor. Most industrial-rated circuit breakers, however, are designed to interrupt, that is break, overload short circuit values that are significantly less than 150 KA. Accordingly, components within the circuit breaker operating mechanism are made of large mechanical structure to withstand the high mechanical and thermal stress associated with such short circuit currents. In addition, arcing must be more precisely controlled, the latching sequence must be more precise, and the degree of contact bounce that can be tolerated must be reduced to accommodate the short circuit currents.

Since the short circuit interruption-breaking current values occurring within an industrial electrical distribution system are much lower than peak closing short circuit current values, eliminating the need for a circuit breaker operating mechanism to close and latch onto a short circuit fault would subject the circuit breaker contacts and closing mechanism to considerably less mechanical and thermal stress. Therefore, eliminating the need for the circuit breaker to close and latch onto a short circuit fault would obviate the need for a stronger latching mechanism and would relax tolerances on the control of arcing, the latching sequence, and the degree of contact bounce.

BRIEF SUMMARY OF THE INVENTION

In an exemplary embodiment of the invention, a circuit breaker with fault lockout protection includes a plurality of contacts forming part of an electrical distribution circuit. The contacts are separable to isolate a load side of the electrical distribution circuit from a line side of the electrical distribution circuit. The line side has a line voltage. A test current is induced on the load side of the electrical distribution circuit by a test voltage, which is less than the line voltage. A sensing device is arranged for sensing the test current in the load side of the electrical distribution circuit. The sensing device provides a sensed signal indicative of an electrical characteristic of the test current. A processor is arranged to detect a fault condition on the load side of the electrical distribution circuit in response to the sensed signal. The processor generates a fault lockout signal when the fault condition is detected. A fault lockout device receives the fault lockout signal and prevents closure of the plurality of contacts in response to the fault lockout signal.

DETAILED DESCRIPTION OF THE INVENTION

Figure 1:
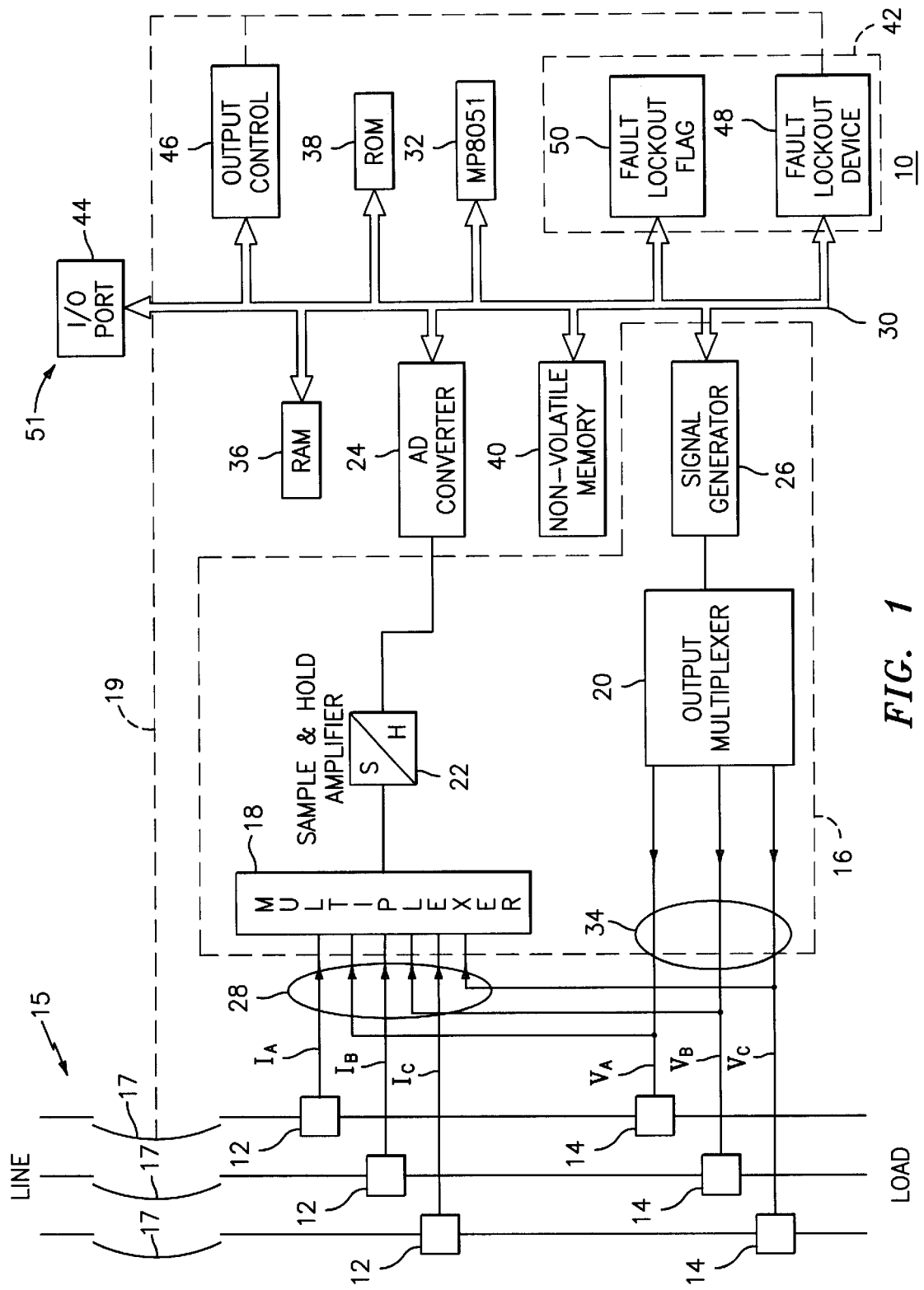
FIG. 1 is a schematic block diagram of a fault lockout controller of the present invention.

FIG. 1 shows a fault lockout protection controller 10 for detecting the existence of a short circuit fault and preventing closure of an associated set of circuit breaker contacts if a short circuit fault has been detected. Fault lockout protection controller 10 uses a fault current detection method described within U.S. patent application, entitled "Fault Current Detection Meter and Method", which is filed concurrently herewith and incorporated by reference.

Fault lockout protection controller 10 is in the form of a printed circuit card with all the circuit components except the current transformers 12 and the potential transformers 14 mounted on circuit cards (not shown). Fault lockout controller 10 is contained within a circuit breaker enclosure along with the circuit breaker contacts and operating mechanism such as described within U.S. Pat. No. 4,754,247 entitled "Molded Case Circuit Breaker Accessory Enclosure", which is incorporated by reference.

One potential transformer 14 and one current transformer 12 are disposed about each phase of a three-phase power distribution system 15. Transformers 12 and 14 arranged to inject a test voltage onto the load side of the distribution circuit 15. The test voltage is less than the line voltage (the voltage from the line side 15 of the electrical distribution circuit to ground). The test voltage induces a test current in each phase of the load side of the distribution circuit 15, which is sampled by transformers 12. Current transformers 12 provide a current signal indicative of the sampled test current to a conditioning circuit 16.

Conditioning circuit 16 includes multiplexers 18 and 20, a sample and hold amplifier 22, and a signal generator 26. Multiplexer 18 receives the current signals from transformers 12 via lines 28. Multiplexer 18 arranges the current signals in interleaved fashion, and provides a string of signals to a sample and hold amplifier 22. Sample and hold amplifier 22 amplifies the signals and then provides the string of signals to an analog to a digital (A/D) converter 24. A/D converter 24 converts the signals to square waveforms and provides the digitized signals to data bus 30. Signal generator 26 and output multiplexer 20 provide the voltage signal to be injected by transformers 14. Signal generator 26 receives digitized signals from a processor 32 via data bus 30 and outputs a string of voltage signals to output multiplexer 20. Output multiplexer 20 de-multiplexes the string of voltage signals, and provides the voltage signals to lines 34, where the voltage signals are received by transformers 14 to be injected on each phase of the power distribution circuit 15.

Data bus 30 allows data communications between A/D converter 24, microprocessor 32, RAM (random access memory) 36, signal generator 26, ROM (read only memory) 38, NVM (nonvolatile memory) 40, a fault lockout module 42, an I/O (input/output) port 44, and an output control module 46. Processor 32 receives the digitized signals output by A/D converter 24. Processor 32 stores these signals in its associated memory registers and executes instructions based on these signals and program instructions received from RAM 36 or ROM 38. Based on one or more of these inputs, processor 32 outputs a control signal to fault lockout module 42 or signal generator 26. Calibration, testing, programming and other features are accomplished through a communications I/O port 44, which communicates with microprocessor 32 via bus 30. ROM 38 includes fault lockout protection controller application code, e.g., main functionality firmware, including initializing parameters, and boot code. The application code further includes code for a fault lockout algorithm, described hereinafter. Non-volatile memory 40 may include, for example, EEPROM (electronic erasable programmable read only memory) for the storage of operational parameters such as electrical current and harmonic threshold settings, described hereinafter. Parameters in non-volatile memory 40 may be stored at the factory and are selected to meet customers' requirements, but can also be remotely downloaded through the I/O port 44A.

Fault lockout module 42 includes a fault lockout device 48 and a fault lockout flag 50. Fault lockout device 48 is arranged to receive a lockout signal from processor 32 via bus 30 and prevent the closure of the circuit breaker contacts 17 when the lockout signal is received. Fault lockout device 48 may comprise, for example, an electromechanical device, such as a solenoid that acts to physically restrain the circuit breaker contacts 17 via a mechanical link 19. Fault lockout flag 50 is arranged to receive the lockout signal from processor 32 via bus 30 and provide a signal to a remote indicator (not shown).

Preferably, data bus 30, microprocessor 32, RAM 36, ROM 38, NVM 40, analog to digital converter 24, and I/O port 44 form part of an electronic trip unit (circuit breaker controller) 51, such as that described in U.S. Pat. No. 4,672,501. The fault lockout controller 48 and fault lockout flag 50 are contained within module 42 for insertion in a separate compartment within the circuit breaker case, as described in aforementioned U.S. Pat. No. 4,754,247.

In operation, processor 32 provides an initiating signal indicative of a known frequency to signal generator 26 via data bus 30. Upon receipt of the initiating signal, signal generator 26 applies a string of signals to output multiplexer 20. Output multiplexer 20 de-multiplexes the string of signals and provides a test voltage signal to each voltage transformer 14 via lines 34. Transformers 14 inject these test voltage signals to each phase of the electrical distribution circuit. Processor 32 waits for a delay period to allow transient effects of the injected signals to settle, and then accepts the sampled test current signals provided by current transformers 12 through conditioning circuit 16. This process is repeated by injecting test voltages at different frequencies, which are selected by processor 32 based on stored instructions. Processor 32 uses the sampled signals to determine a representative current for the load side of the distribution circuit 15 and then compares the representative current with a predetermined current threshold value stored in non-volatile memory 40. If the current is above this threshold, processor 32 provides a lockout signal to the fault lockout device 48 and fault lockout flag 50. Upon receiving this lockout signal, fault lockout device 48 prevents the closure of the breaker contacts 17, and fault lockout flag 50 provides for remote indication of breaker lockout. If the current is below the threshold value, fault lockout device 48 is not activated, and the circuit breaker contacts 17 are allowed to close.

Alternatively, after processor 32 waits for the delay period to allow transient effects of the injected signals to settle, processor 32 then accepts the sampled current signals provided by current transformers 12 and sampled voltage signals provided by voltage transformers 14 through conditioning circuit 16. This process is repeated by injecting voltages at different frequencies, which are selected by processor 32 based on stored instructions. Processor 32 uses the sampled voltage and current signals to determine a representative impedance for the load side of the distribution circuit 15. The processor 32 can determine the impedance by dividing the root-mean-square (RMS) voltage by the RMS current. Processor 32 can also determine the phase angle between the current and the voltage, and can determine the resistance and inductance of the load side of the electrical distribution system at each frequency. After processor 32 determines the representative impedance, it then compares the representative impedance with a predetermined impedance threshold value stored in non-volatile memory 40. If the impedance is below this threshold, processor 32 provides a lockout signal to the fault lockout device 48 and fault lockout flag 50.

Figure 2:
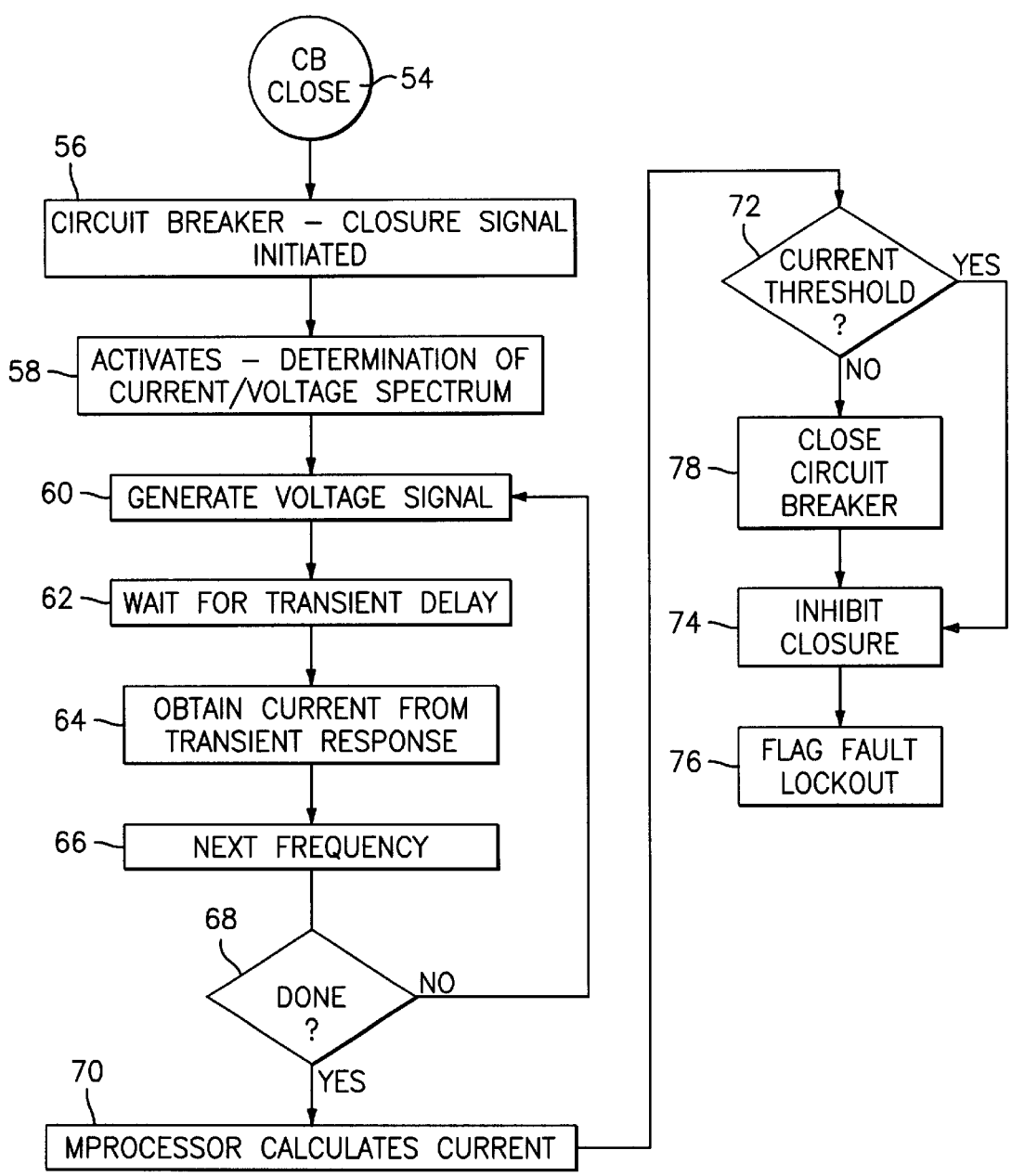
FIG. 2 is a flow diagram of the fault lockout algorithm for use in the circuit breaker controller of FIG. 1.

Referring to FIGS. 1 and 2, a fault lockout algorithm (52) for use in fault lockout protection controller 10 is shown. On initiating circuit breaker contact closure (54), the microprocessor 32 outputs a circuit breaker contacts closure signal (56). Because harmonic voltages and currents may already be present in the power system 15, errors can be introduced. To eliminate such errors, a scan of voltage and current harmonics is performed (58). The results of this scan are used by processor 32 to prevent the use of frequencies where significant harmonics (i.e. harmonics above a predetermined threshold value) are present. A predetermined frequency is then set to a minimum (first) value, such as 120 Hz or the second harmonic of a 60 Hz fundamental. If frequencies are to be scanned below the fundamental frequency, the sequence would begin with, for example, 30 Hz, continuing to 15, 7.5 Hz, etc. A test voltage signal of the predetermined frequency is then generated (60) and applied to each phase of the electrical distribution circuit. After the delay period has expired (62) an electrical current value is obtained from the electrical distribution circuit (64), and the frequency is changed (e.g., incremented to the next resonant frequency) (66). It is then determined whether the electrical distribution system 15 has been analyzed for all frequencies of interest (68). This can be performed, for example, by referring to instructions stored in the memory associated with processor 32. If additional relevant frequencies are to be analyzed, the process returns to (60), where another voltage signal is generated. If no additional frequencies are to be analyzed, microprocessor 32 calculates a representative current value for the electrical distribution system 15 using the test current values sampled at the various frequencies (70). The representative current value is then compared to a threshold current value (72). If there is no fault present, the circuit breaker contacts 17 are closed (78). If the representative current exceeds the current threshold value, indicating a fault in the load side of the electrical distribution circuit 15, the circuit breaker contacts 17 are inhibited from closing (74) and the existence of a fault is indicated (76). Thus, the breaker contacts 17 are prevented from closing onto high-level short circuit conditions.

Figure 3:
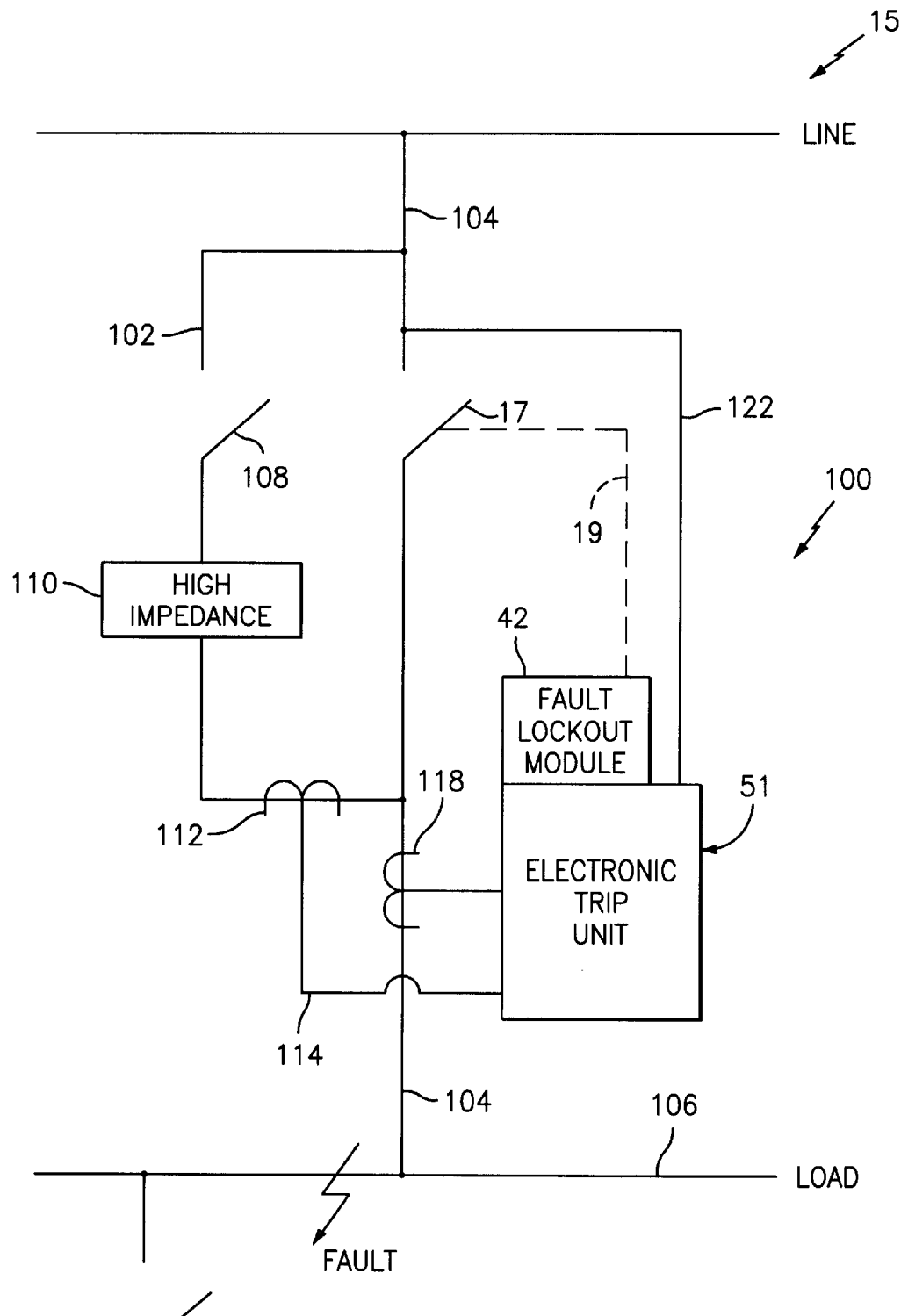
FIG. 3 is a schematic block diagram showing an alternate embodiment of a fault lockout controller of the present invention.
Figure 3:
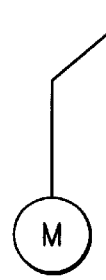

FIG. 3 is a single line diagram for a fault lockout protection controller 100 according to another embodiment of the present invention. Fault lockout protection controller 100 includes a contact bypass line 102 connected parallel to a supply line 104 of a protected circuit 106 for providing a test voltage to the load side of the distribution circuit 15. Contact bypass line 102 includes an auxiliary switch 108 for interrupting the flow of electrical current in contact bypass line 102. Contact bypass line 102 also includes a high impedance device 110 for reducing the voltage on the load side of distribution circuit 15 to below line voltage. Line 102 further includes a current transformer 112 for providing a signal indicative of current in contact bypass line 102 (current signal) to a current sample line 114.

Supply line 104 includes main contacts 17 of a circuit breaker for interrupting the flow of electrical current in supply line 104. A current transformer 118 is disposed about supply line 104 for providing a signal indicative of the current in supply line 104 to an electronic trip unit 51. Electronic trip unit 51 senses current in supply line 104, and opens main contacts 17 on the presence of overcurrent in line 104, as described in aforementioned U.S. Pat. No. 4,672,501. Line 114 provides the current signal from current transformer 112 to electronic trip unit 51. A voltage sample line 122 provides a signal indicative of supply line 104 voltage (voltage signal) to the electronic trip unit 51. Electronic trip unit 51 is powered by voltage from the line side of supply line 104 or through an auxiliary power supply (not shown).

Prior to closing breaker contacts 17, auxiliary switch 108 is closed to allow test current to flow through contact bypass line 102. Current passing through contact bypass line 102 is sensed by current transformer 112, which provides the current signal indicative of the current through bypass line 102 to line 114. Electronic trip unit 51 receives the current signal from line 114. If the current signal received by electronic trip unit 51 indicates a current below a predetermined current threshold value, then the main contacts 17 are allowed to close. If the current signal received by electronic trip unit 51 indicates a current above the predetermined threshold value, indicating a short circuit on the load side of circuit, then a lockout signal is generated by the electronic trip unit 51 to prevent closure of the breaker contacts 17. Thus, the breaker contacts 17 are prevented from closing onto high-level short circuit conditions, and impedance device 110 protects the electronic trip unit 51 and current transformer 112 from the high currents associated with a short circuit. Additionally, the electronic trip unit 51 can generate an alarm activation/indication signal to indicate a short circuit.

In an alternate embodiment, current transformer 118 senses current passing through contact bypass line 102 to provide a signal indicative of this sensed current to the electronic trip unit 51. In this embodiment, current transformer 112 and line 114 are not needed.

Figure 4:
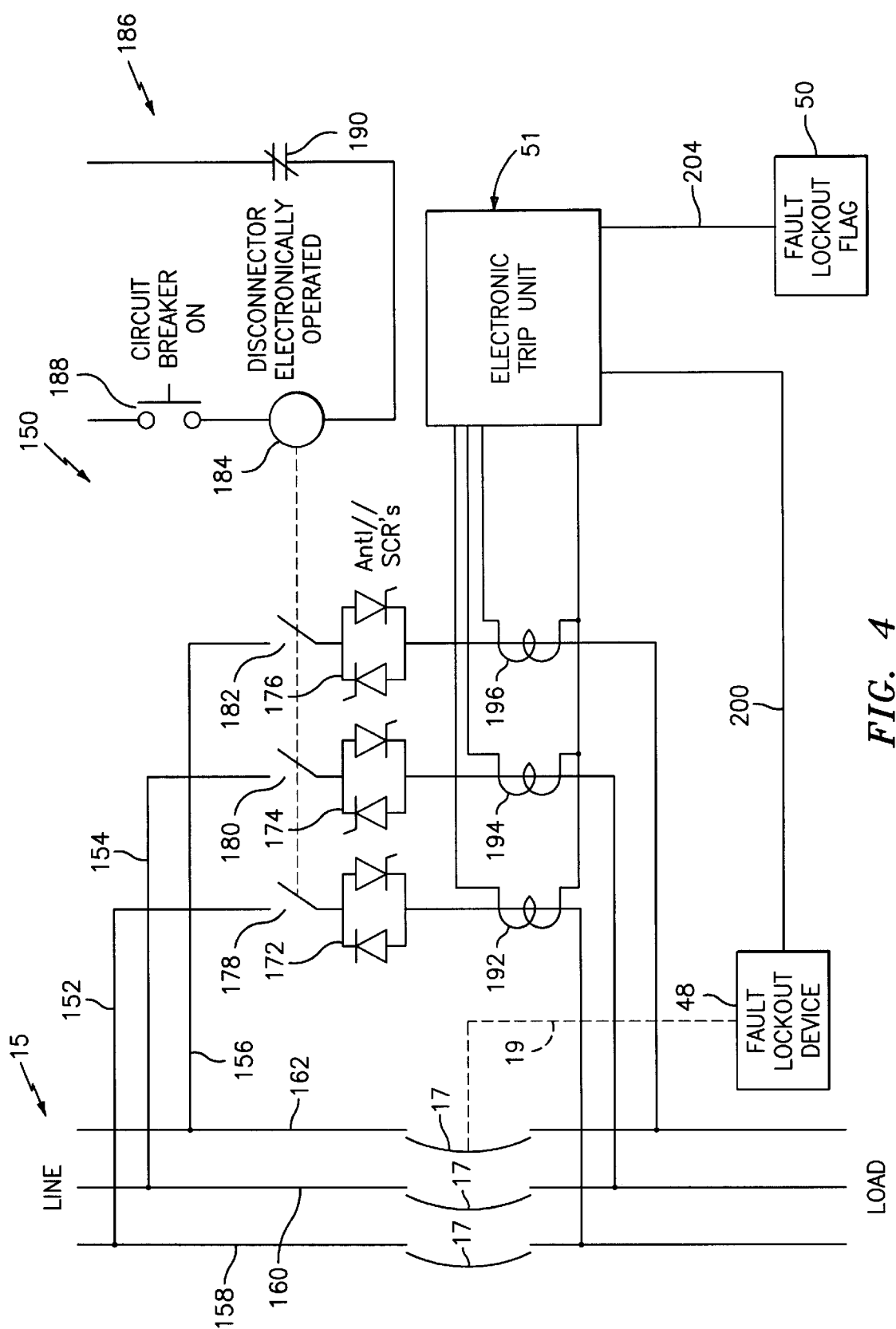
FIG. 4 is schematic block diagram showing another alternate embodiment of a fault lockout controller of the present invention.

FIG. 4 shows a fault lockout protection controller 150 according to another embodiment of the present invention. In FIG. 4, contact bypass lines 152, 154, 156 are connected parallel to supply lines 158, 160, 162, respectively, to provide test voltage to the load side of distribution circuit 15. Supply lines 158, 160, 162 include main contacts 17 for interrupting the flow of electrical current in supply lines 158, 160, 162. Main contacts 17 are controlled by an electronic trip unit 51 such as that described in aforementioned U.S. Pat. No. 4,672,501. Each contact bypass line 152, 154, 156 includes silicon controlled rectifiers in anti-parallel pairs 172, 174, 176 and an auxiliary switch 178, 180, 182. Silicon controlled rectifiers (SCRs) 172, 174, 176 are arranged to ramp-up the voltage in contact bypass lines 152, 154, 156, respectively, over time. SCRs 172, 174, 176 control the voltage in lines 152, 154, 156 by allowing passage of current in contact bypass lines 152, 154, 156 only after "θ" radians past the start of each positive cycle of the current wave. In other words, SCRs 172, 174, 176 allow only part of each current wave to pass. SCRs 172, 174, 176 ramp-up the voltage by decreasing θ over time, thus allowing more of the current wave to pass. For example, SCRs 172, 174, 176 can be arranged to increase the test voltage from zero volts to some predetermined voltage (e.g. line voltage) over several cycles. Auxiliary switches 178, 180, 182 are arranged to allow the flow of electrical current in contact bypass lines 152, 154, 156, respectively, immediately before breaker closing. Auxiliary switches 178, 180, 182 are operated by a disconnector 184 included in a starter circuit 186. Starter circuit 186 also includes a normally open activation switch 188 and a normally closed auxiliary switch 190, which are connected in series to disconnector 184. Starter circuit 186 receives power from an auxiliary source (not shown).

Disposed about each contact bypass line 152, 154, 156 are current transformers 192, 194, 196, respectively. Current transformers 192, 194, 196 sense the electrical current in contact bypass lines 152, 154, 156 and provide a signal indicative of this sensed current (current signal) to the electronic trip unit 51.

Electronic trip unit 51 is arranged to provide a lockout signal to a fault lockout device 48 via a line 200 and to a fault lockout flag 50 via a line 204. Fault lockout device 48 is arranged to prevent the closure of contacts 17 when the lockout signal is received. Fault lockout device comprises, for example, an electromechanical device, such as a solenoid, connected to contacts 17 via a mechanical link 19. Fault lockout flag 50 is arranged to provide a signal to a remote indicator (not shown) when the lockout signal is received.

To close circuit breaker, the activation switch 188 is depressed, providing electrical current to disconnector 184. When energized, disconnector 184 acts to close auxiliary switches 178, 180, 182. Auxiliary switches 178, 180, 182 allow a test current to pass on contact bypass lines 152, 154, 156 from the line side of breaker contacts 17 to the load side of breaker contacts 17 through SCRs 172, 174, 176. SCRs 172, 174, 176 gradually increase voltage over time, thus eliminating the switching transient current on contact bypass lines 152, 154, 156. Electronic trip unit 51 receives current signals from transformers 192, 194, 196, and determines a load side current value from the current signals. If the current value determined by electronic trip unit 51 is below a predetermined threshold value, indicating no fault, then voltage on lines 152, 154, 156 is ramped up to its full, predetermined voltage by SCRs 172, 174, 176 and the main contacts 17 are allowed to close. Alternatively, if the current value determined by electronic trip unit 51 is below the predetermined threshold value, indicating no fault, then the main contacts 17 are allowed to close and voltage on lines 152, 154, 156 is ramped up to its full, predetermined voltage by SCRs 172, 174, 176. If the current value is above a predetermined current threshold value, indicating a short circuit on the load side of circuit 15, then a lockout signal is provided by the electronic trip unit 51 to breaker lockout device 48, preventing closure of the breaker contacts 17. Thus, the breaker contacts 17 are prevented from closing onto high-level short circuit conditions, and SCRs 172, 174, 176 protect the electronic trip unit 51 from the high currents associated with a short circuit. Additionally, the electronic trip unit 51 provides the lockout signal to fault lockout flag 50, which provides for remote indication of the fault condition.

A circuit breaker having a fault lockout protection controller has herein been described for preventing closure of the breaker contacts onto high-level short circuit conditions. Because the possibility of closure onto short circuit conditions is eliminated, there is no longer a need for the stronger latching mechanism and tighter tolerances required to compensate for the high fault currents associated with closing onto a short circuit condition. As a result, the present invention would result in a lower cost, lighter, faster circuit breaker contacts and closing mechanism that allow the circuit breaker to open and interrupt overcurrent fault currents more efficiently.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of providing fault lockout protection in a circuit breaker, the circuit breaker having a plurality of contacts forming part of an electrical distribution circuit, the contacts being separable to isolate a load side of the electrical distribution from a line side of the electrical distribution circuit, the line side having a line voltage, the method comprising:

providing a first test voltage at a first frequency to the load side of the electrical distribution circuit to induce a first test current in the load side of electrical distribution circuit, the first test voltage being less than the line voltage;

sensing the first test current to provide a first sensed signal indicative of an electrical characteristic of the first test current;

detecting a fault condition on the load side of the electrical distribution circuit in response to the first sensed signal;

preventing closure of the separable circuit breaker contacts upon detection of a fault condition on the load side of the electrical distribution circuit;

providing a second test voltage at a second frequency to the load side of the distribution circuit to induce a second test current in the load side of the distribution circuit, the second test voltage being less than the line voltage; and sensing the second test current on the load side of the electrical distribution circuit to provide a second sensed signal indicative of the electrical characteristic of the second test current, said detecting the fault condition on the load side of the electrical distribution circuit is in response to response to said first and second sensed signals.

2. The method of claim 1, wherein said detecting a fault condition on the load side of the electrical distribution circuit includes:

calculating a value indicative of a load side current in response to the first sensed signals; and comparing the value to a predetermined current threshold.

3. The method of claim 1, wherein said detecting a fault condition on the load side of the electrical distribution circuit includes:

calculating a value indicative of a load side impedance in response to the first sensed signal; and comparing the impedance value to a predetermined impedance threshold.

4. The method of claim 1, further including:

scanning a plurality of harmonic frequencies in the load side of the electrical distribution circuit; and comparing the plurality of harmonic frequencies to a predetermined frequency threshold to determine the first and second frequencies.

5. The method of claim 1, further including:

increasing the first test voltage over a period of time.

6. A fault lockout protection controller for providing fault lockout protection in a circuit breaker, the circuit breaker having a plurality of contacts forming part of an electrical distribution circuit, the contacts being separable to isolate a load side of the electrical distribution circuit from a line side of the electrical distribution circuit, the line side having a line voltage, the fault lockout protection controller comprising:

a sensing device arranged for sensing a first test current in the load side of the electrical distribution circuit, said first test current being induced by a first test voltage, said first test voltage being less than the line voltage and having a first frequency, said sensing device providing a first sensed signal indicative of an electrical characteristic of the first test current;

a processor arranged to detect a fault condition on the load side of the electrical distribution circuit in response to said first sensed signal, said processor generating a fault lockout signal when said fault condition is detected;

a fault lockout device arranged to prevent closure of the plurality of contacts in response to said fault lockout signal;

a signal generator arranged to receive a first initiating signal from said processor and generate a first voltage signal in response to said first initiating signal; and a voltage transformer arranged to provide said first test voltage to the load side of the distribution circuit in response to said first voltage signal.

7. The fault lockout protection controller of claim 6, further including:

a fault lockout flag arranged to provide indication of said fault condition in response to said fault lockout signal.

8. The fault lockout protection controller of claim 6, wherein said signal generator is further arranged to receive a second initiating signal from said processor and generate a second voltage signal in response to said second initiating signal, said voltage transformer is further arranged to provide a second test voltage having a second test frequency to the load side of the distribution circuit in response to said second voltage signal, said sensing device is further arranged for sensing a second test current in the load side of the electrical distribution circuit, said second test current being induced by said second test voltage, said sensing device providing a second sensed signal indicative of an electrical characteristic of the second test current, and said processor is further arranged to detect a fault condition on the load side of the electrical distribution circuit in response to said first and second sensed signals.

9. The fault lockout protection controller of claim 6, wherein said sensing device is a current transformer.

10. The fault lockout protection controller of claim 6, wherein said processor calculates a value indicative of a load side current in response to said first sensed signal and compares said value to a predetermined current threshold to detect said fault condition.

11. The fault lockout protection controller of claim 6, wherein said processor calculates a value indicative of a load side impedance in response to said first sensed signal and compares said value to a predetermined impedance threshold to detect said fault condition.

12. The fault lockout protection controller of claim 6, further including:
   an impedance device arranged parallel to said plurality of contacts, said impedance device for reducing said line voltage to said first test voltage.

13. The fault lockout protection controller of claim 12, wherein said impedance device is arranged to increase said first test voltage over a period of time.

14. The fault lockout protection controller of claim 13, wherein said impedance device is a silicon controlled rectifier.

15. A circuit breaker with fault lockout protection, the circuit breaker comprising:
   a plurality of contacts forming part of an electrical distribution circuit, said contacts being separable to isolate a load side of the electrical distribution circuit from a line side of the electrical distribution circuit, said line side having a line voltage;
   a sensing device arranged for sensing a first test current in the load side of the electrical distribution circuit, said first test current being induced by a first test voltage, said first test voltage being less than the line voltage and having a first frequency, said sensing device providing a first sensed signal indicative of an electrical characteristic of said first test current;
   a processor arranged to detect a fault condition on the load side of the electrical distribution circuit in response to said first sensed signal, said processor generating a fault lockout signal when said fault condition is detected;
   a fault lockout device arranged to prevent closure of said plurality of contacts in response to said fault lockout signal
   a signal generator arranged to receive a first initiating signal from said processor and generate a first voltage signal in response to said first initiating signal; and
   a voltage transformer arranged to provide said first test voltage to the load side of the distribution circuit in response to said first voltage signal.

16. The circuit breaker of claim 15, further including:
   a fault lockout flag arranged to provide indication of said fault condition in response to said fault lockout signal.

17. The circuit baker of claim 15, wherein
   said signal generator is further arranged to receive a second initiating signal from said processor and generate a second voltage signal in response to said second initiating signal,
   said voltage transformer is further arranged to provide a second test voltage having a second test frequency to the load side of the distribution circuit in response to said second voltage signal,
   said sensing device is further arranged for sensing a second test current in the load side of the electrical distribution circuit, said second test current being induced by said second test voltage, said sensing device providing a second sensed signal indicative of an electrical characteristic of said second test current, and
   said processor is further arranged to detect a fault condition on the load side of the electrical distribution circuit in response to said first and second sensed signals.

18. The circuit breaker of claim 15, wherein said sensing device is a current transformer.

19. The circuit breaker of claim 15, wherein said processor calculates a value indicative of a load side current in response to said first sensed signal and compares said value to a predetermined current threshold to detect said fault condition.

20. The circuit breaker of claim 15, wherein said processor calculates a value indicative of a load side impedance in response to said first sensed signal and compares said value to a predetermined impedance threshold to detect said fault condition.

21. The circuit breaker of claim 16, further including:
   an impedance device arranged parallel to said plurality of contacts, said impedance device for reducing said line voltage to said first test voltage.

22. The circuit breaker of claim 21, wherein said impedance device is arranged to increase said first test voltage over a period of time.

23. The circuit breaker of claim 22 wherein said impedance device is a silicon controlled rectifier.

24. A method of providing fault lockout protection in a circuit breaker, the method comprising:
   providing a first test voltage at a first frequency to each phase on a load side of an electrical distribution circuit to induce a first test current in the load side of electrical distribution circuit, the first test voltage being less than the line voltage;
   providing a second test voltage at a second frequency to said each phase on the load side of the distribution circuit to induce a second test current in the load side of the distribution circuit, the second test voltage being less than the line voltage;
   sensing the first and second test currents on the load side;
   detecting a fault condition on the load side of the electrical distribution circuit in response to at least one of the sensed first and second test currents; and
   preventing closure of separable circuit breaker contacts on said each phase upon detection of a fault condition on the load side of the electrical distribution.

25. The method of claim 24, wherein the separable circuit breaker contacts includes a plurality of contacts forming part of an electrical distribution circuit, the contacts being separable to isolate a load side of the electrical distribution from a line side of the electrical distribution circuit, the line side having the line voltage.

26. The method of claim 24, wherein said detecting a fault condition on the load side of the electrical distribution circuit includes:
   calculating a value indicative of a load side current in response to at least one of the first and second test currents; and
   comparing the value to a predetermined current threshold.

27. The method of claim 24, wherein the first frequency is smaller than the second frequency.

28. The method of claim 27, wherein the first frequency is incremented to the second frequency being the next resonant frequency.

29. The method of claim 24, wherein the detecting a fault condition on the load side includes sampling the first and second test currents to determine a representative current value, the representative value is then compared to a threshold current value to determine a fault condition.

* * * * *